(12) United States Patent
Canfield et al.

(10) Patent No.: US 11,286,012 B2
(45) Date of Patent: Mar. 29, 2022

(54) TRACKED CLIMBING MACHINE WITH COMPLIANT SUSPENSION APPARATUS

(71) Applicant: TENNESSEE TECHNOLOGICAL UNVERSITY, Cookeville, TN (US)

(72) Inventors: Stephen Lee Canfield, Cookeville, TN (US); James Walter Beard, Cookeville, TN (US)

(73) Assignee: Tennessee Technological University, Cookeville, TN (US)

(*) Notice: Subject to any disclaimer, the term of this patent is extended or adjusted under 35 U.S.C. 154(b) by 0 days.

(21) Appl. No.: 16/358,551

(22) Filed: Mar. 19, 2019

(65) Prior Publication Data
US 2020/0398911 A1  Dec. 24, 2020

Related U.S. Application Data

(63) Continuation of application No. 14/061,369, filed on Oct. 23, 2013, now Pat. No. 10,232,896, which is a continuation of application No. 12/657,962, filed on Jan. 29, 2010, now Pat. No. 8,567,536.

(51) Int. Cl.
| | | |
|---|---|---|
| *B62D 55/065* | (2006.01) |
| *B62D 55/075* | (2006.01) |
| *B62D 55/10* | (2006.01) |
| *B62D 55/20* | (2006.01) |
| *B62D 55/265* | (2006.01) |
| *B62D 55/30* | (2006.01) |

(52) U.S. Cl.
CPC ......... *B62D 55/065* (2013.01); *B62D 55/075* (2013.01); *B62D 55/10* (2013.01); *B62D 55/20* (2013.01); *B62D 55/265* (2013.01); *B62D 55/30* (2013.01)

(58) Field of Classification Search
CPC .... B62D 55/065; B62D 55/075; B62D 55/10; B62D 55/20; B62D 55/265; B62D 55/30
See application file for complete search history.

(56) References Cited

U.S. PATENT DOCUMENTS

| | | | | |
|---|---|---|---|---|
| 5,697,463 A * | 12/1997 | Schlegl | ................ | B62D 55/096 180/6.7 |
| 5,894,901 A * | 4/1999 | Awamura | ............. | B62D 55/265 180/9.54 |
| 8,567,536 B1 * | 10/2013 | Canfield | ............. | B62D 55/065 180/9.3 |
| 10,232,896 B2 * | 3/2019 | Canfield | ............. | B62D 55/265 |

* cited by examiner

*Primary Examiner* — Jacob D Knutson
(74) *Attorney, Agent, or Firm* — A. J. Bahou; Chris McNeill; Waller Lansden Dortch & Davis, LLP

(57) ABSTRACT

A tracked climbing vehicle containing a compliant suspension apparatus to prescribe the distribution of forces on the adhering members in the tracked climbing machine. The compliant suspension apparatus is configured to negotiate irregularities in a climbing-surface without the vehicle tracks losing full surface contact and adhesion by distributing the loads from the climbing machine chassis to the adhering traction members in a specific prescribed fashion. The apparatus thus avoids exceeding the allowable force in any adhering traction member and significantly improves the performance of the climbing machine.

20 Claims, 10 Drawing Sheets

TRACKED CLIMBING MACHINE WITH COMPLIANT SUSPENSION APPARATUS

This application is a continuation of Ser. No. 14/061,369, filed Oct. 23, 2013, which is a continuation of U.S. application Ser. No. 12/657,962, filed Jan. 29, 2010, issued as U.S. Pat. No. 8,567,536, issued on Oct. 29, 2013, and is entitled to those filing dates for priority. The specifications, figures and complete disclosures of U.S. application Ser. Nos. 12/657,962 and 14/061,369 are incorporated herein by specific reference for all purposes.

FIELD OF INVENTION

This invention relates to a robotic tracked vehicle. More specifically, this invention relates to a robotic tracked vehicle for climbing with endless tracks.

BACKGROUND OF THE INVENTION

Self-propelled climbing machines or vehicles may be employed to perform remote operations in locations that are difficult for, or incompatible with, human presence or access. One example is a vehicle that can travel over a steel surface in a vertical, horizontal or upside-down configuration, such as on tanks, pipes, boiler walls or ship hulls, and also carry equipment to perform manufacture, maintenance or inspection functions. There are many structures which require maintenance, repair, inspection or manufacturing operations that could be performed by a remote machine in a tele-operated or autonomous fashion.

Numerous vehicles have been proposed to travel over inclined surfaces, and even operate upside down. These vehicles generally employ legs, wheels, or endless-tracks. Vehicles using endless-tracks provide several advantages, in particular the potential for a large area of contact between the vehicle and contact surface. Endless-tracks provide exceptional potential for large-area surface contact between the track-members (for example magnets) and the climbing-surface.

This invention concerns vehicles of the endless-track type with magnetic track-members incorporated in the endless-tracks. These vehicles are intended to operate on significant inclines, or upside down and/or on surfaces having, alone or in combination, concave, convex or irregular contours.

The endless-track type climbing vehicles available in previous technologies may have adhering track-members attached to the tracks and employ an endless-track of specific properties, to include very high tensile stiffness of the endless-track itself, in the axial direction of the track, but negligible stiffness in all transverse directions and negligible stiffness with respect to in bending. This creates a technological disadvantage in that the track in such cases is capable of supporting tensile forces, but has only minimal stiffness in bending or in tension for small angles. Accordingly, it can support only negligible loads in any other direction, cannot support sheer side loads, and cannot support compressive loads.

For such a climbing vehicle to remain in equilibrium in any given position and orientation on a climbing-surface, forces affecting that equilibrium must be transferred from the climbing-surface to the vehicle. For a simple track type climbing vehicle, these forces are transferred from the track-members to the vehicle chassis through tensions in the endless-track. This would ideally allow the endless-track to accommodate irregular climbing surfaces, but would concurrently result in localizing on the outer adhering track-members all of, or a majority of, the forces necessary to affect and maintain positional and orientational equilibrium with the climbing surface.

The surface normal forces are a subset of the total forces that are required to maintain vehicle equilibrium on the climbing-surface. The surface normal forces are perpendicular to the climbing-surface and are required for equilibrium. To distribute this subset of forces in a manner intended to maintain equilibrium between the climbing vehicle and the climbing-surface, one might envision employment of a rigid guide section that slidably connects to the endless-track. But this approach creates its own set of disadvantages in that it causes the surface normal forces to be localized on individual adhering track-members whenever and wherever climbing-surface irregularities are encountered.

The performance of an endless-track type climbing vehicle depends directly on the effective ability of the track, and accordingly, the track-members, to adhere to the climbing-surface. Numerous patents exist for climbing vehicles containing endless-tracks with adhering track-members incorporated into the tracks. One shortcoming of these previous technologies is their universal lack of a means to distribute the load among these adhering track-members in a manner that can accommodate a wide variety of surface geometrics. Creation of such a load distribution means would significantly improve the performance of these climbing vehicles, and is, therefore, a desirable advancement in the art. As is detailed below, previous technologies do not provide effective means to distribute the load among a plurality of adhering track-members.

The following discussion details and contrasts the instant art with illustrative examples of previous technologies and their associated shortcomings that the instant art overcomes.

U.S. Pat. No. 5,894,901, by Awamura, incorporated herein by specific reference for all purposes, presents a traditional suspension system consisting of a plurality of press wheels equipped with elastic members (springs). These are capable of providing adjustment to the adhering members directed in to the climbing-surface only. The device provides, in contrast to the instant art, no means to compensate for, or to integrate, any other forces or balance adjustments. Although, as does the instant art, the Awamura device includes magnets, an endless-track, and a suspension system, as designed, it only makes provision to adjustments necessary to push the magnets into contact with the climbing-surface. The device is equipped with auxiliary wheels, each wheel having a suspension supported by the vehicle body, pressing the wheel against the endless-track. These wheels are each supported by an elastic member in communication with the vehicle chassis. This is in contrast to the instant applicant's use of a compliant beam guide and support which automatically adjusts to balance the load carried and to maximize traction.

U.S. Pat. No. 5,435,405 by Schempf, et al., incorporated herein by specific reference for all purposes, teaches a reconfigurable mobile robot with magnetic tracks. In contrast to the instant art, which uses permanently active magnets in the tracks, Schempf teaches a magnetic system that can be activated and deactivated in the propulsion tracks. In further contrast, no guide, rigid or otherwise, is mentioned with respect to the endless-track. Finally, unlike the instant art, the track appears to have no track-guide.

U.S. Pat. No. 4,789,037 by Kneebone, incorporated herein by specific reference for all purposes, uses two or more endless-tracks with plurality of permanent magnetic adhering-members. Each adhering-member comprises a permanent magnet sandwiched between magnetic metal plates.

The magnet does not, itself, contact the climbing-surface, but contacts only these metal plates. As taught, it does allow pivotal rocking motion of track assemblies relative to the vehicle body, for negotiating uneven or curved surfaces, the track assemblies comprising, for each track unit, two laterally-spaced chains, each forming an endless-member. The device also uses a pump in the center of the body to apply additional upward or downward pressure to press the tracks onto the climbing-surface, and does teach a fan to create suction force normal to the climbing-surface. But the patent mentions no sort of trackguide, rigid or otherwise.

U.S. Pat. No. 5,884,642 by Broadbent, incorporated herein by specific reference for all purposes, teaches endless-tracks with plurality of magnetic sections, each tread using four rare earth magnetic segments, adjacent treads being oriented in opposing polarities. It does not, however, discuss any type of guide for the tracks, nor automatic balance control or adjustment.

U.S. Pat. No. 4,828,059 by Naito, et al., incorporated herein by specific reference for all purposes, employs a track guide that is used only to engage and disengage track magnets from climbing-surfaces. Locations of loads carried by the Naito device are limited to remaining within the upper and lower planes of the endless propulsion tracks. It employs a plurality of permanent magnets on outer surface of crawler tracks and has a guidance device on crawler tracks for restraining the releasing crawler track from moving relative to crawler body in direction normal to traveling plane of magnets. It also includes a track control mechanism so designed such that the guidance device can restrain or release motion of the track to the main body in a direction normal to the surface. When this guide load is released, the load is essentially transferred in its entirety, to only the end magnets of the tracks.

U.S. Pat. No. 5,487,440 by Seemann, incorporated herein by specific reference for all purposes, presents a rigid guide, and a pair of parallel, endless-tracks equipped with suction cup feet. These tracks slide along a grooved structure that allows for communication between a vacuum pump and those suction cups which are positioned for contact with the climbing-surface. It makes little or no provision for significant surface irregularities.

U.S. Pat. No. 6,672,413 B2 by Moore, et al., incorporated herein by specific reference for all purposes, describes a remote controlled inspection vehicle utilizing magnetic adhesion to traverse non-horizontal, non-flat, ferromagnetic surfaces. Although this device employs magnets to adhere to the climbing-surface, no magnets are attached to, or guided by a track. The magnets are, rather, attached directly to the vehicle. The track comprises modules each of which contains a permanent magnet that the endless-track surrounds. These modules are so constructed as to pivot about longitudinal axes in an attempt to conform to pipes or other irregularities.

Thus, an invention such as described herein, that distributes the forces required to maintain equilibrium between the vehicle and climbing-surface during operation among a plurality of adhering track-members, is novel to the state of art and is usefully and directly applicable to climbing vehicles having, or requiring, adhering track-members incorporated in endless-tracks. The herein taught art comprises a compliant suspension apparatus that distributes stiffness (and correspondingly the forces of equilibrium) relative to the plurality of adhering track-members.

SUMMARY OF INVENTION

In various embodiments, the present invention comprises a tracked climbing machine having one or more revolving or cyclical gripping devices with adhering track-members. The revolving or cyclical gripping device is preferably in the form of one or more closed or endless, tracks, chains, belts, or cables upon the exterior of which the previously mentioned adhering track-members are mounted. This tracked vehicle can climb vertical surfaces and overhangs, and negotiate surface irregularities, and in doing so, prevent its tracks from losing full surface contact and adhesion.

Its innovations are particularly useful in transiting, ascending and otherwise negotiating unprepared boiler sides, submarine hulls, ships sides, towers and other ferrous structures to perform automated or remotely controlled inspection, maintenance, and cleaning tasks that could not otherwise be accomplished. The device is notably adept at climbing vertical surfaces and overhangs and it is able to negotiate surface irregularities without its tracks losing full surface contact and adhesion. It moves and climbs in a manner employing multiple feet, preferably aligned in two or more columns or tracks, by applying, adjusting, and releasing each individually gripping foot in response to whatever surface contour may be encountered by that particular foot.

A significant advance introduced by this technology is the bias devices installed along the compliant beam. These devices exert forces on the beam, in such a way as to distribute the pressure of the track in a uniform manner, even when the transited surface is non-planar. This particularly improves overall track performance when transiting small bumps or hummocks on the surface.

Further objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Figure 1:
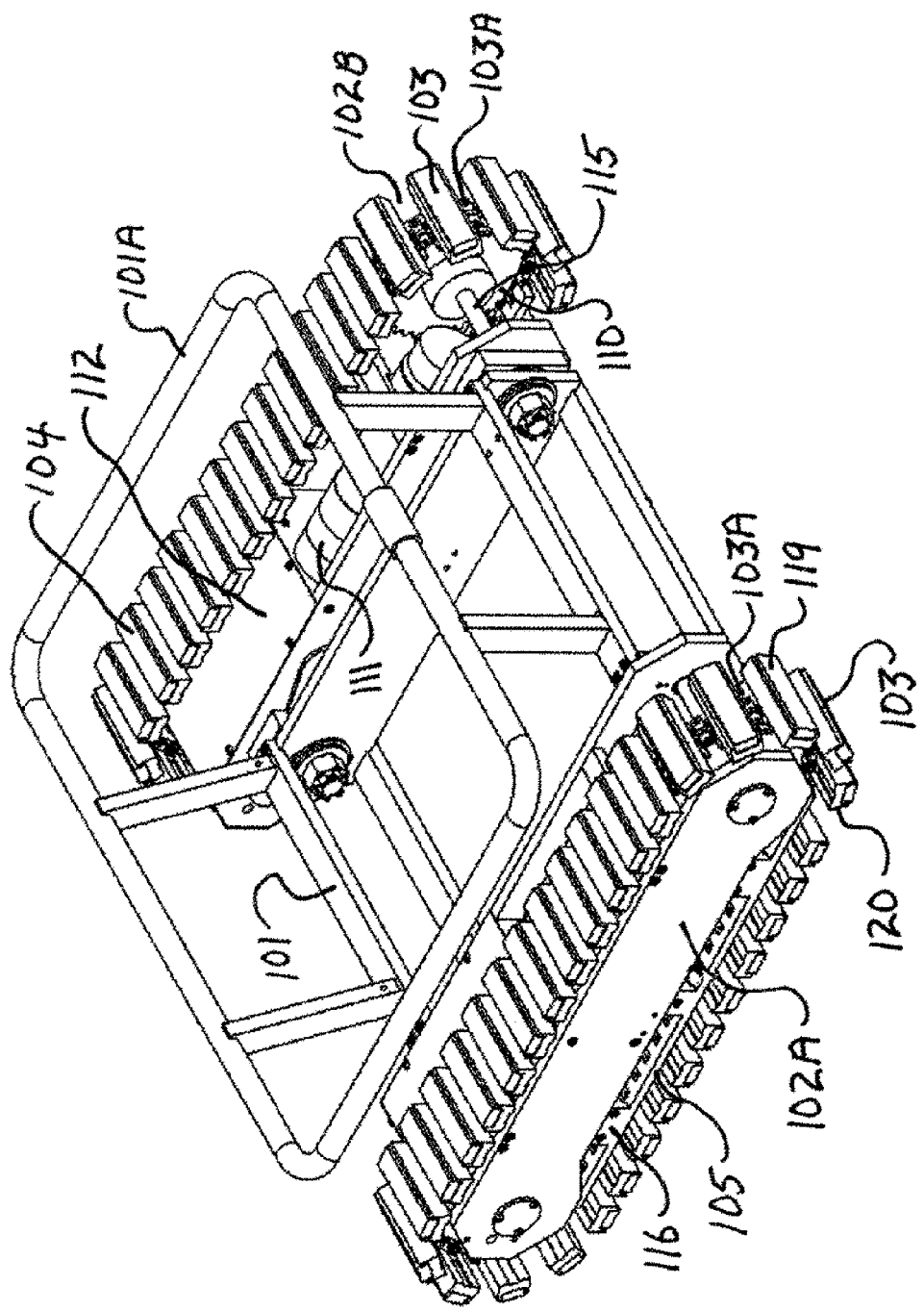
FIG. 1 is an isometric view of the climbing vehicle composed of the vehicle chassis, two track-modules, and endless-track.

LIST OF NUMBERED ELEMENTS 101 vehicle chassis
101a chassis payload-rack
102a port side track-module
102b starboard side track-module
103 endless-track
103a track sliding-members
104 adhering track-members
105 compliant beam
106 fore tangential guide-linkage
107 aft tangential guide-linkage
108 contour-following bias-device
108a fore contour-following bias-device
108b midship's contour-following bias-device
108c aft contour-following bias-device
109 drive-sprocket
110 track-sprocket
111 drive-motor
112 transmission
113 guide-slot
114 drive-sprocket axle
115 track-sprocket axle
116 compliant suspension apparatus
118 tensioning mechanism
119 magnet
120 support-block
121a fore bias-adjuster
121b mid bias-adjuster
121c aft bias-adjuster
D1 direction of motion
CS climbing-surface
CI contour or irregularity
u1 axis u1 normal to the climbing-surface CS
u2 axis u2, in the plane of the climbing-surface CS and normal to the axis of the direction of movement endless-track
u3 axis along track direction of motion D1
R1 first independent track-module axes of limited rotational freedom about an axis in the plane of the climbing-surface CS
R2 second independent track-module axes of limited rotational freedom about an axis in the plane normal to that of the climbing-surface CS

DETAILED DESCRIPTION OF EXEMPLARY EMBODIMENTS

Detailed descriptions of exemplary embodiments are provided herein. It is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 2:
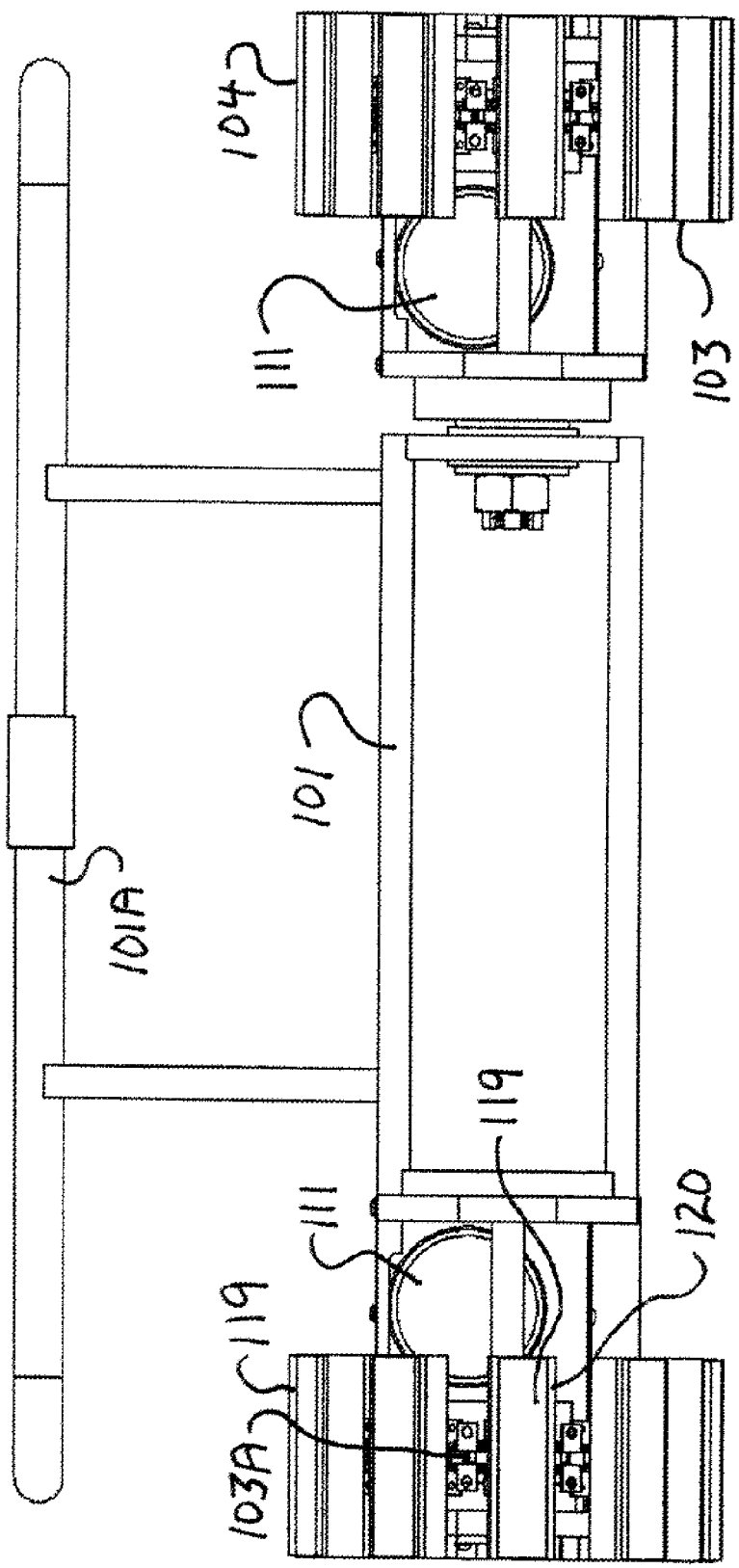
FIG. 2 is a front view of the climbing vehicle showing a front view of the vehicle chassis, track-modules, and endless-track.

In one exemplary embodiment, as seen in FIGS. 1 and 2, the present invention comprises a self-propelled work vehicle for traversing a surface, comprised of a vehicle chassis 101, to which a payload may be attached. The vehicle is equipped with one or more track-modules 102a, 102b that support the vehicle chassis 101, and which support endless-tracks 103, these tracks 103 incorporating a plurality of magnetic track-members 104 spaced along each endless-track 103. The chassis 101 may be adapted to carry a multiplicity of payloads, tools or equipment.

As seen in FIGS. 3, 4, 7, 8 and 9, the endless-track 103 with track-members 104 cyclically moves in such a way as to provide locomotive force. When the vehicle is in motion, portions of the track are constantly cycling through a traction-portion of its cycle, wherein they make contact with the climbing-surface (CS). As seen in FIGS. 4, 5, 7, 8 and 9, a compliant suspension apparatus 116 incorporates a compliant beam member 105 to which the revolving or cyclical track 103 is slidably connected.

In short summary of the device and its operation, the climbing vehicle and chassis 101 are subject to a variety of forces, including gravitational and dynamic loads associated with the vehicle and payload motion, as well as to forces generated by the operation of the tooling or equipment attached to the vehicle. These forces are to be transferred to the climbing-surface (CS) through the endless-track 103 and adhering track-members 104, preferably permanent magnets 119. The forces are compensated for by the compliant suspension apparatus, and bias devices, adjusted according to Hooke's law which relates force, displacement and stiffness. This adjustment may be applied automatically or manually.

The suspension and compliant beam apparatus of this device dictate how the above forces are transmitted from the vehicle chassis 101 to the adhering track-members 104 over a wide range of surface irregularities or contours (CI) of the climbing-surface (CS). This apparatus, a combination mechanism of a compliant beam 105 slidably connected to the track 103, rigid-body members, and bias-devices or springs 108, maximizes track contact with the climbing-surface (CS) in a manner different from and superior to previous technologies and permits the flexible endless-track to propel and support a rigid vehicle chassis in a more continuous, and therefore more effective manner.

Figure 5:
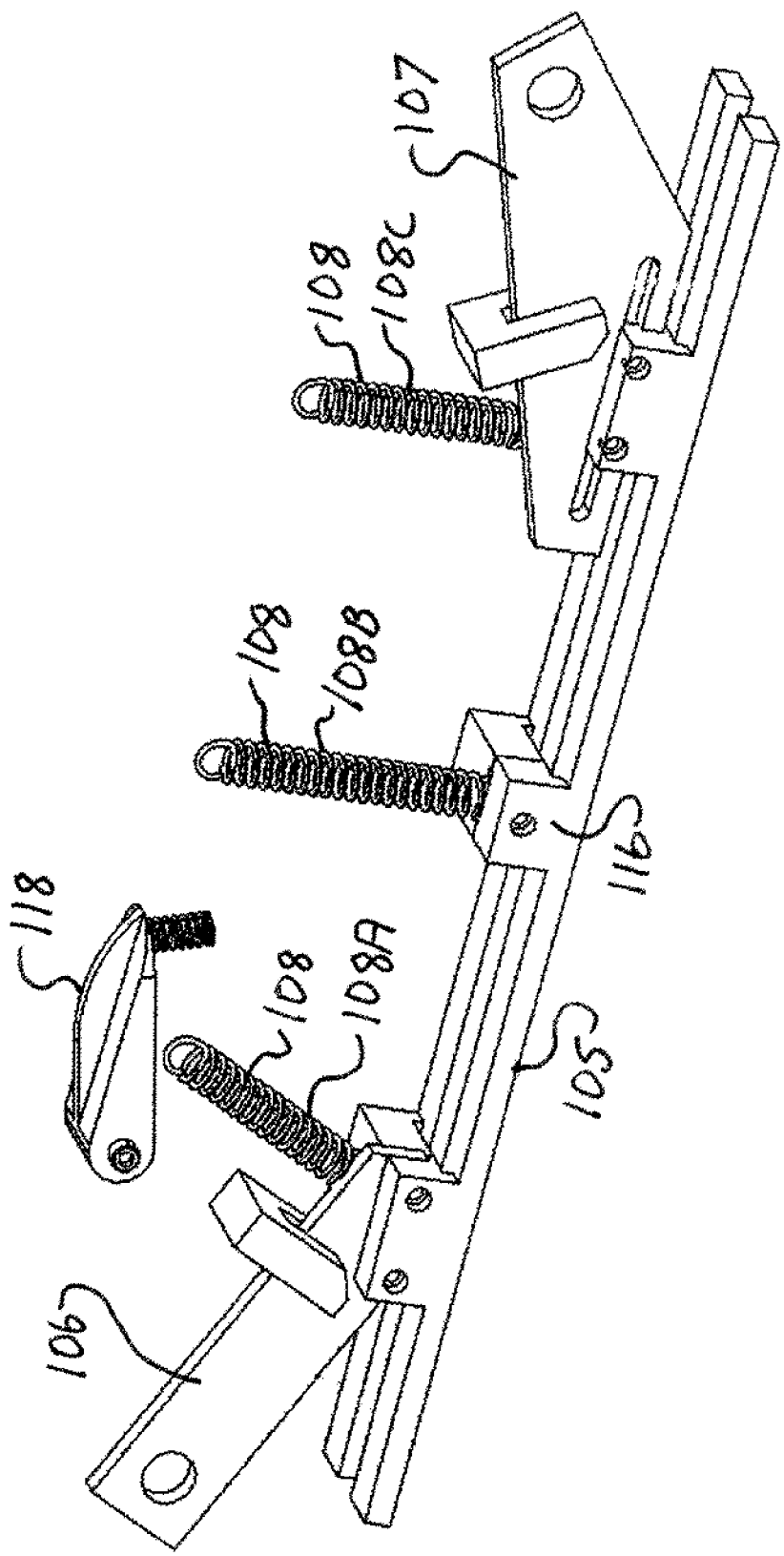
FIG. 5 shows the primary components of the compliant suspension apparatus isolated from the track-module.

The apparatus which achieves the above prescribed stiffness or compliance consists of three primary components. These components, in the embodiment shown in FIG. 5, are as follows: the one or more compliant beams 105; the rigid-body tangential guide-linkages 106, 107; and the contour-following bias-device elements 108. A compliant beam 105 is slidably attached to the endless-track 103. The compliant beam's 105 geometric and material properties are established to be compatible with the geometry of a climbing-surface (CS) having a wide range of contours or irregularities.

Figure 10:
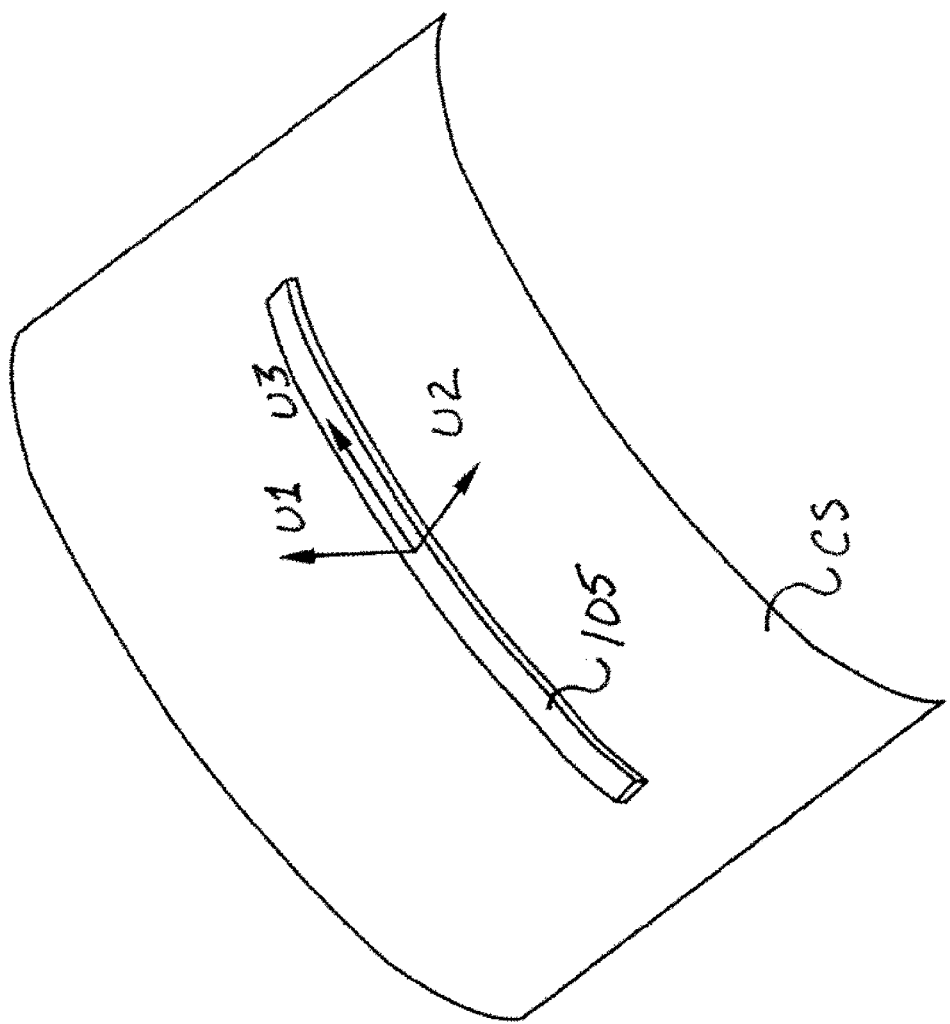
FIG. 10 shows a diagram of the climbing-surface (CS) with compliant beam. A basis set of directions are defined at a point along the compliant beam as: u1, a unit axis normal to the climbing surface (CS); u2, along the axis of the endless-track at this point; and u3, the right-hand axis of the frame.

The compliant beam 105 of FIG. 10 is conjugate and slidably connected to the endless-track (not shown) and prescribes five specific stiffness (or compliance) components between the climbing-surface (CS) and the climbing machine body. These include all axis cardinal directions in three-dimensional space, except the direction of movement D1 of the endless-track. Since the compliant apparatus is slidably connected to the endless-track, no stiffness is prescribed on that axis of the endless-track.

Listing the components addressed, they are, as shown in FIG. 10:

1) translational stiffness along unit axis u1 normal to the climbing-surface (CS);

2) translational stiffness along unit axis u2, in the plane of the climbing-surface (CS) and normal to the axis of the endless-track;

3) rotational stiffness about u1 normal to the climbing-surface (CS);

4) rotational stiffness about u2, an axis in the plane of the climbing-surface (CS) and normal to the axis of the endless-track; and 5) rotational stiffness about u3, the axis of the endless-track.

The linear stiffness along u1 is prescribed along the entire track to uniformly distribute the forces on the adhering track-members. The linear stiffness along u2 is prescribed to limit transverse deflection of the endless-track (high stiffness). The rotational stiffness about u1 is prescribed to limit rotation of the endless-track (high stiffness) about an axis normal to the climbing-surface (CS). The rotational stiffness about u2 is prescribed to allow low stiffness along the center portion of the endless-track to accommodate contours or irregularities in the climbing-surface (CS) and high stiffness where the endless-track engages the track sprockets.

The rotational stiffness about u3 is prescribed to allow low stiffness along the center portion of the endless-track to accommodate contours or irregularities in the climbing-surface (CS), and high stiffness where the endless-track engages the track-sprockets.

As noted above, the compliant beam 105 provides a surface conjugate to the endless-track 103 in a slidable connection. The fore tangential guide-linkage 106 enforces the stiffness and geometry of the compliant beam 105 conjugate to the endless-track 103 at the point where the endless-track 103 engages the drive-sprocket 109. The aft tangential guide-linkage 107 enforces the stiffness and geometry of the compliant beam 105 conjugate to the endless-track 103 at the point where the endless-track 103 engages the track-sprocket 110. The contour-following bias-device members 108a, 108b, 108c prescribe the stiffness of the compliant beam 105 in the u1 direction to more uniformly distribute the forces in the adhering track-members 104.

Figure 4:
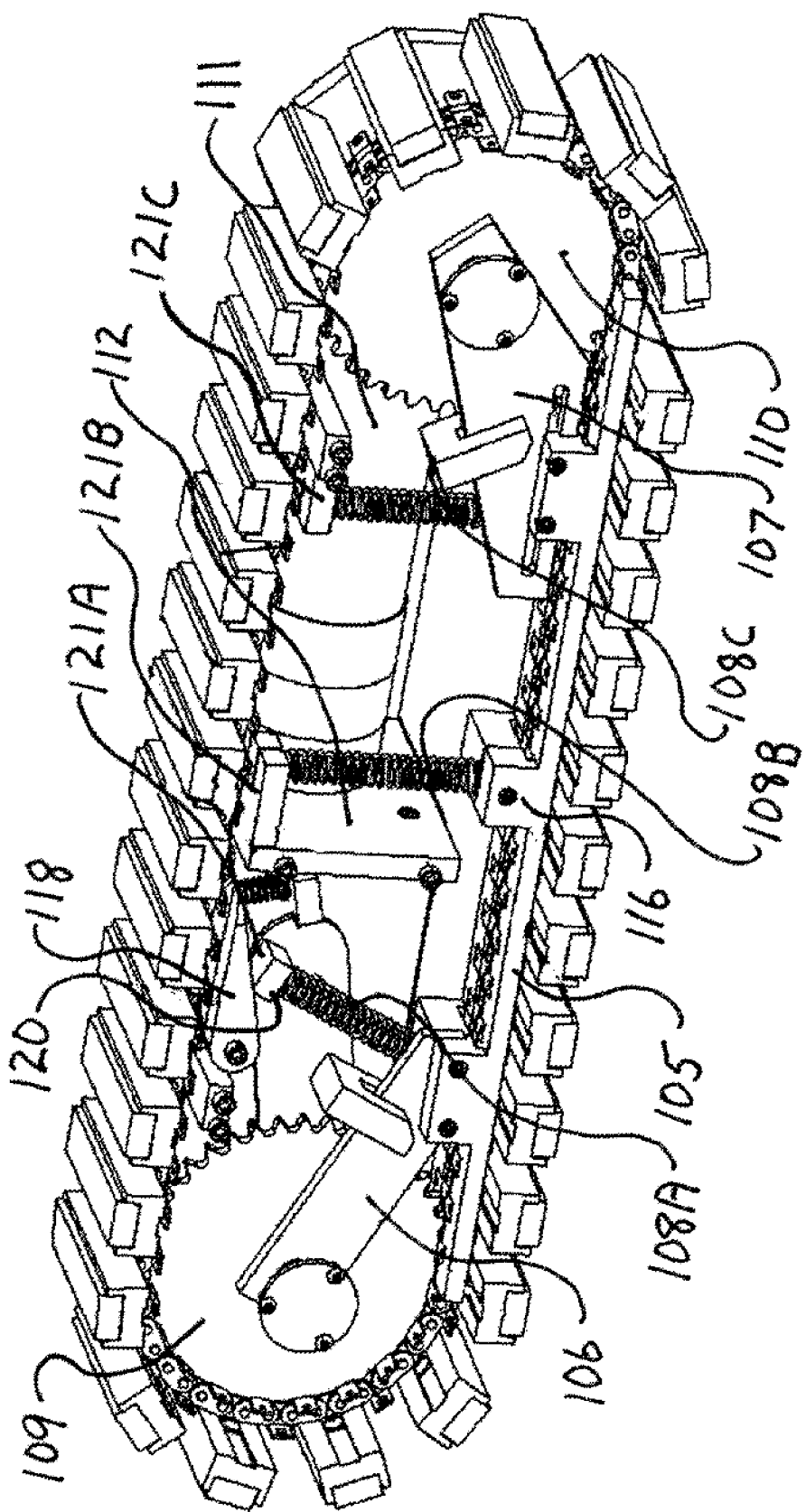
FIG. 4 is an isometric view of a single track-module with the exterior cover cut away showing the compliant suspension apparatus consisting of compliant beam member, fore tangential guide link, aft tangential guide link, contour-following bias-devices, fore, mid and aft bias adjuster and tensioning mechanism. Also shown in FIG. 4 are the track drive components: i.e., drive-sprocket, track-sprocket, drive-motor, and transmission.

This compliant beam member 105 is so contrived and adjusted, by means of contour following bias devices 108, 108b, 108c and adjustors 121a, 121b, 121c (see FIG. 4). These bias-devices 108 are located at points along the compliant beam 105, such that each bias-device 108 exerts force upon the compliant beam 105 at its particular point on the beam 105. This changes the force of the track 103 against the transited surface (CS) at that particular tension point. The change of force at this point creates a force to pull portions of the track 103 more firmly against the transited surface (CS) by promoting deformation of the compliant beam 105 to conform with the topography of the surface (CS) being transited.

This causes track 103 force against the transited surface (CS), to be more equally distributed, promoting increased surface contact of all adhering-members along the rest of the track, thereby maximizing the area over which the adhering members of the endless-track contact the transited surface and distributing the force along the track. The benefits of these effects are particularly notable when and where the track encounters small bumps, hummocks or other irregularities (CI) in the climbing surface (CS).

A useful way of understanding this innovation is to imagine this climbing machine, inverted, transiting an overhead surface (CS), essentially clinging magnetically to, and hanging from, the ceiling. In such a position, one can see the benefit of distributing the load along the track 103 through the bias devices and simultaneously ensuring positive pressure between the track 103 and the overhead surface (CS) at each end of the track. In the same way, referring to FIG. 7-9, one can see that as the device passes over an irregularity (CI), the portion of track 103 not in contact with the irregularity (CI) would tend to be pushed out of contact with the climbing-surface (CS), were it not for the bias devices 108. But because of the tension exerted by the bias device 108 on the track 103 in the vicinity of the irregularity (CI), the rest of the track 103 tends to be pulled more firmly into contact with the climbing-surface (CS).

Thus the track 103 and the compliant beam 105, tend to better adapt to contours (CI) of climbing-surfaces (CS) in such a way as to allow the magnetically adhering track-members 104 to maintain traction on the surface (CS). The system is powered by the drive-motor 111 and transmission 112 that propels the track via one or more drive-sprockets 109.

Referring to FIG. 2, the chassis 101 is attached to the track-modules 102a and 102b in a manner that allows two degrees of rotary movement between each track-module 102a, 102b and the chassis 101. As shown in FIG. 1, this movement is about two independent axes R1 being an axis in the plane of the climbing-surface, and R2 being an axis normal to the climbing-surface (CS).

Figure 3:
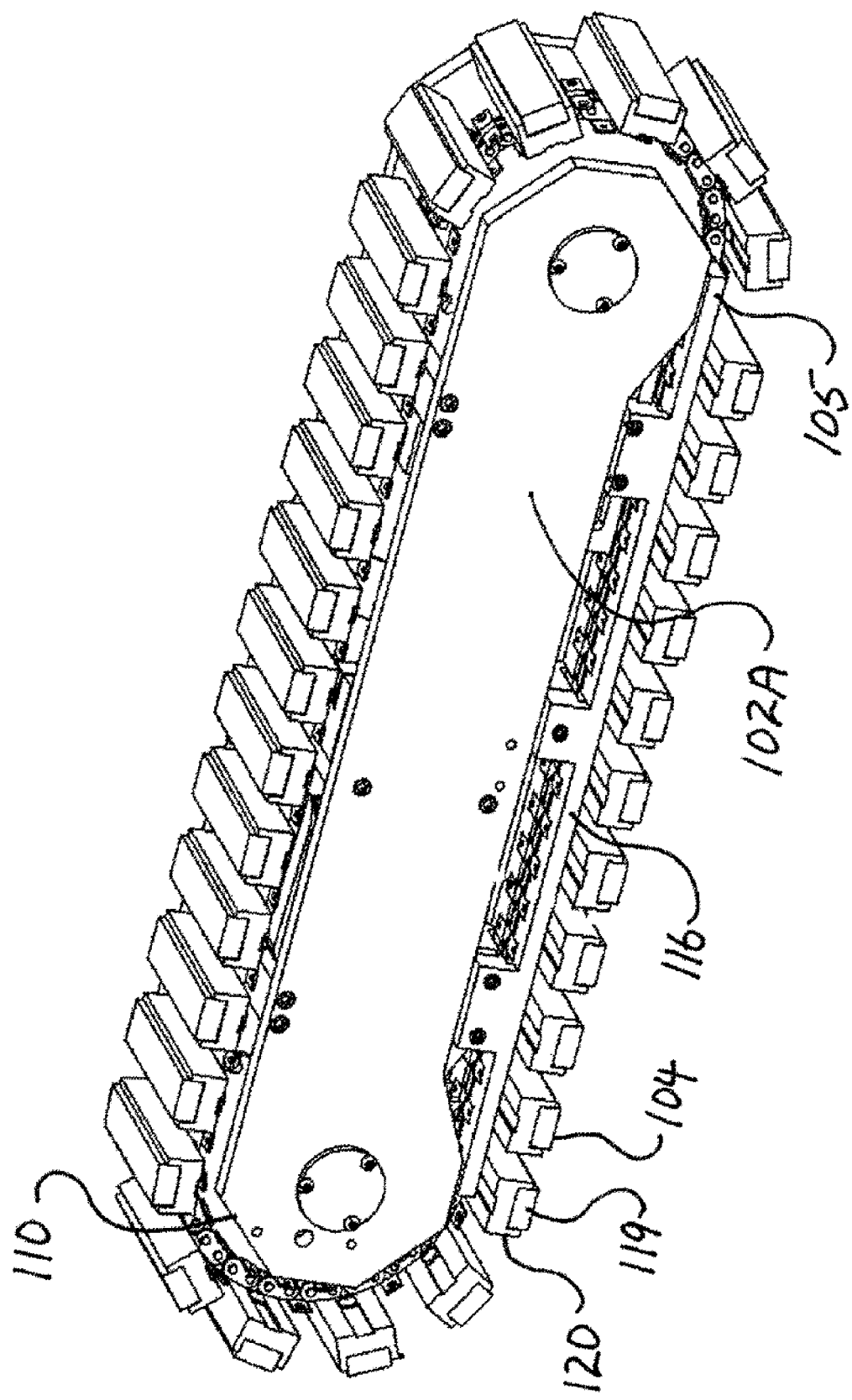
FIG. 3 is an isometric view of a single track-module showing the endless-track and adhering track-members.
Figure 6:
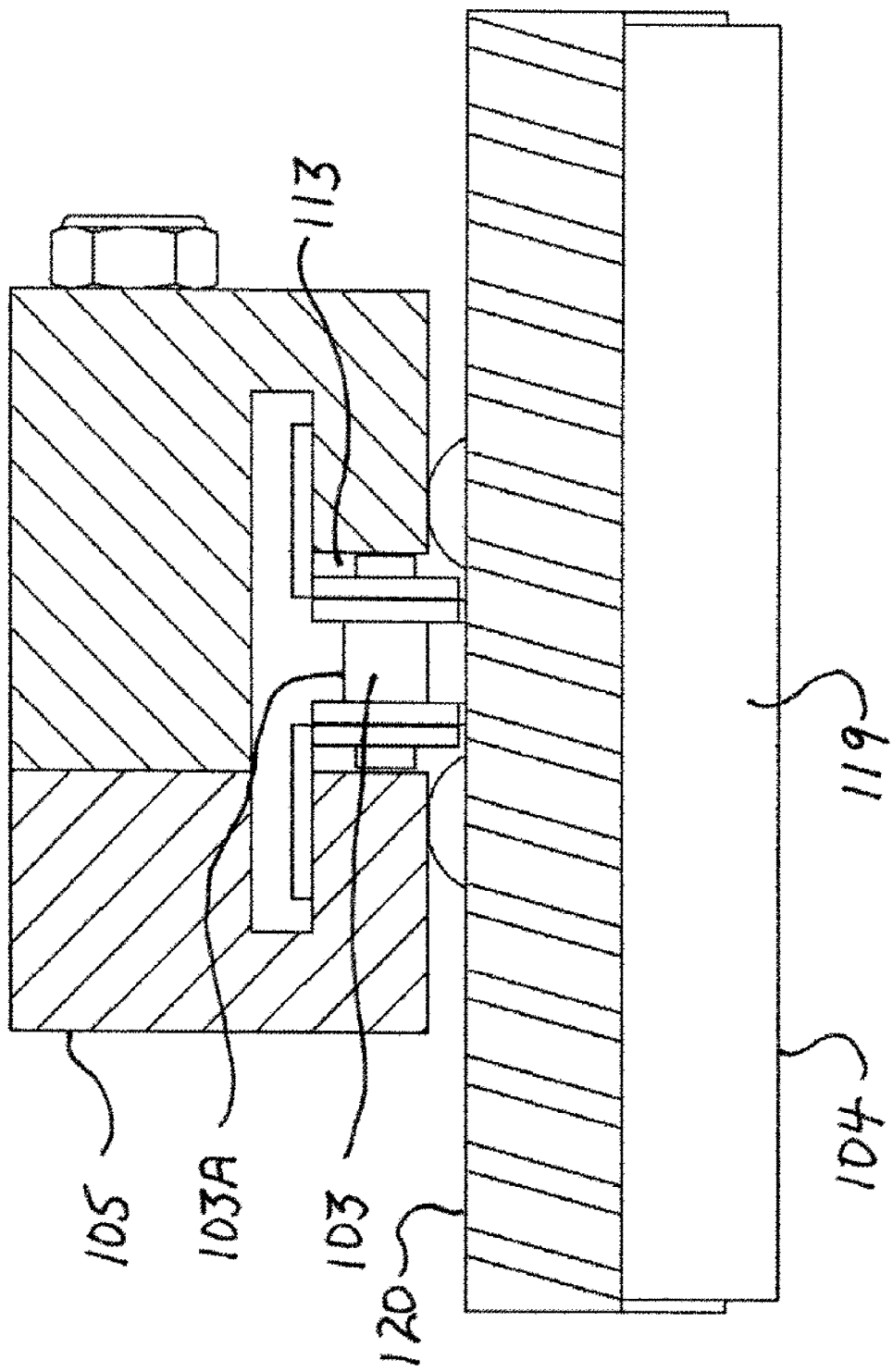
FIG. 6 shows a cross-sectional end-view of the slidable connection between the compliant beam member, the endless-track, and the sliding track-member, guided through guide slot and also of the support block, magnetic adhering track-member, and the connection between the adhering track-member and the endless-track.

Referring to FIG. 6, the adhering track-members 104 each are preferably comprised of a magnet 119 located in a support-block 120. Referring to FIGS. 3 and 4, the support-block 120 is connected to respective sections of the endless-track 103, and sliding member 103a in the guide-slot 113, so that necessary relative motion is available to allow the assembly of endless-track 103 and adhering track-members 104 to pass along and around the path described by the location of the drive and track-sprockets, 109 and 110, the track tensioning mechanism 118, and the guide-slots 113, in the compliant beam member 105.

Referring to FIGS. 3 and 4, a compliant suspension apparatus 116 is contained within the track-modules 102a and 102b. The compliant suspension apparatus 116 consists of compliant beam member 105, fore tangential guide-linkage 106, aft tangential guide-linkage 107, and a plurality of contour-following bias-devices 108a, 108b and 108c.

The compliant beam member 105 is slidably connected to the endless-track 103 through guide-slots 113. The fore tangential guide-linkage 106 is rigidly attached to the compliant beam member 105 and pivotally connected to the track-module 102a at the drive-sprocket axle 114. The aft tangential guide-linkage 107 is slidably connected to the compliant beam member 105 and pivotally connected to the track-module 102a at the track-sprocket axle 115.

The endless-track 103 engages the drive-sprocket 109 and track-sprocket 110. The drive-sprocket 109 and track-sprocket 110 are pivotally connected at the drive-sprocket axle 114 and track-sprocket axle 115 respectively to the track-module 102a to permit pivotal movement of the drive and track-sprockets, 109 and 110. The drive-sprocket 109 is driven by a drive-motor 111 through a transmission 112. Each track-module 102a, 102b is independently driven, allowing the vehicle to be propelled and steered by judicious control of speed and direction of the drive-motor(s) 111.

The endless-track 103 engages the track tensioning mechanism 118. The track tensioning mechanism 118 is pivotally connected to the track-module 102a and is biased with a track-tension bias-device 118 to provide tension in the endless-track 103, as the length of endless-track 103 in contact with the climbing-surface (CS) varies according to the surface irregularities or contours encountered (CI).

The forward external contour-following bias-device 108a is pivotally connected to the compliant beam member 105 and pivotally connected to the track-module 102b. The aft contour-following bias-device 108c is pivotally connected to the fore tangential guide-linkage 106 pivotally connected to the track-module 102b. The aft contour-following bias-device 108 is pivotally connected to the aft tangential guide-linkage 107 and pivotally connected to the track-module 102b as shown in FIG. 4.

In operation, the vehicle chassis 101 is positioned with track adhering members 104 in contact with a climbing-surface (CS). Then, the drive-motor(s) 111 are activated. Proceeding along the climbing-surface (CS), the adhering track-members 104 make sequential contact, each in its turn, with the climbing-surface (CS), while the endless-track 103 slides along the compliant beam member 105, thereby propelling the vehicle.

Figure 7:
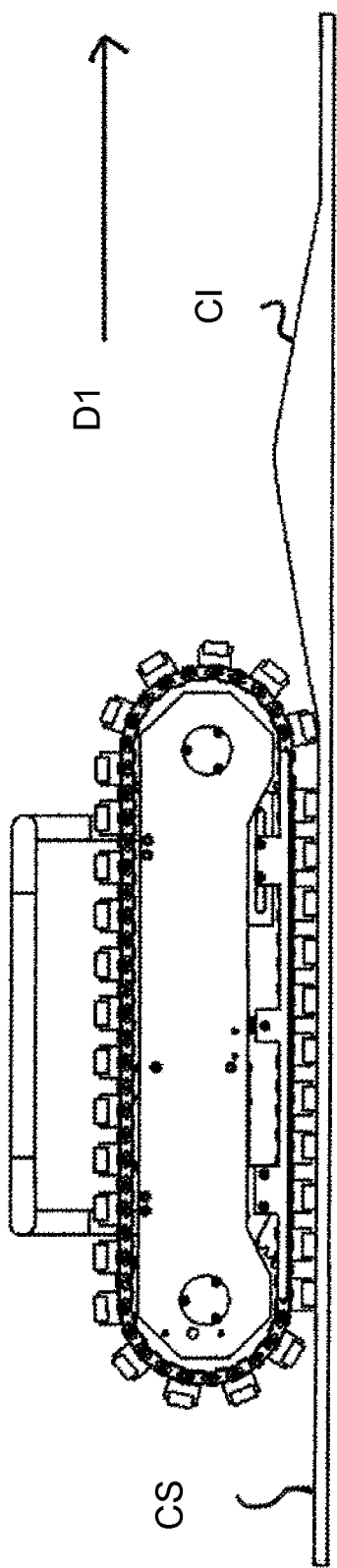
FIGS. 7, 8 and 9 are side views of the device moving in direction D1, encountering an irregularity (CI) in a climbing-surface (CS), also showing operation of the compliant suspension apparatus.
Figure 8:
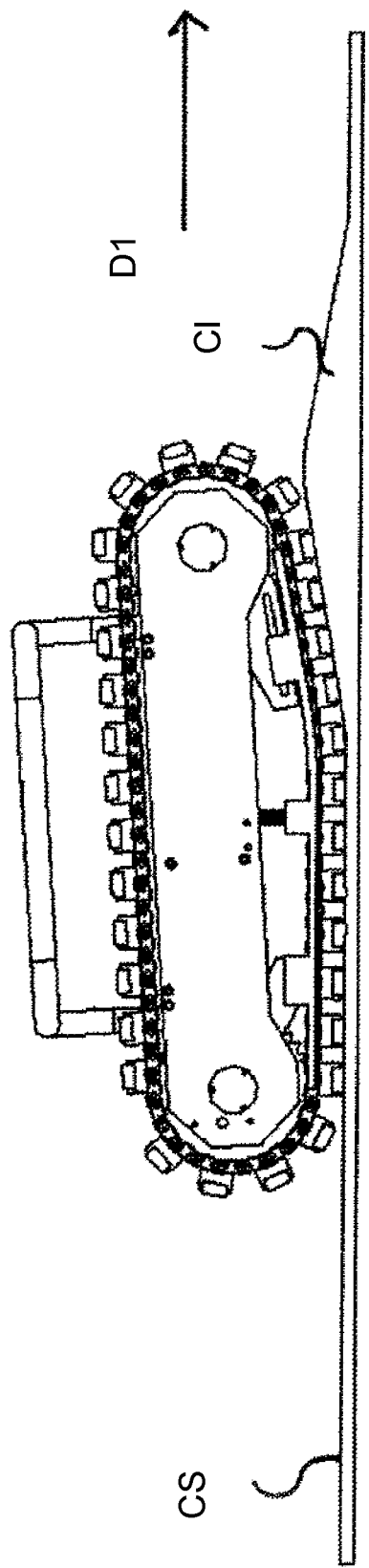
Figure 9:
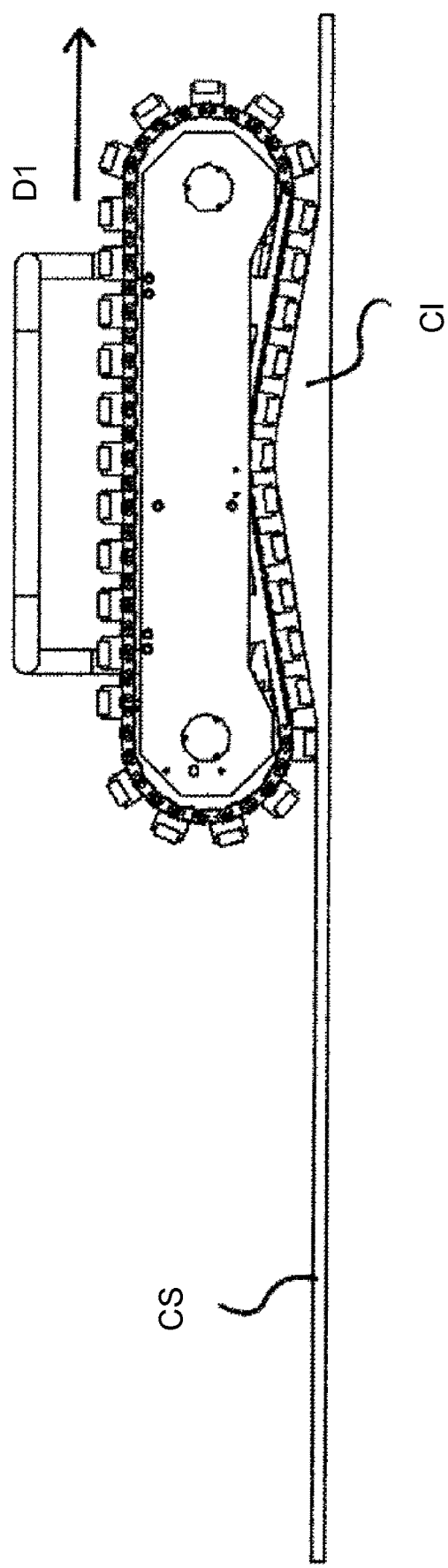

Referring to FIGS. 7-9, when a track adhering member 104 encounters an irregularity (CI) in the climbing-surface (CS), the vehicle and suspension system ingeniously compensate for this surface irregularity (CI) with a high level of precision. Here an irregularity (CI) of the climbing-surface (CS) is defined as any spatial departure of the climbing-surface (CS) from a planar surface. Such surface irregularities may be concave or convex, sharply defined protrusions or rifts, or a combination thereof.

The means of this notably effective compensation are employed as follows. The compliant beam portion 105 of the suspension deforms to match the contour of the climbing-surface irregularity (CI). While deformed, the compliant beam 105 portion maintains its slidable connection 103a to the endless-track 120. The contour-following bias-devices 108a and 108b maintain tension or compression between the deformed compliant beam 105 and the rigid vehicle chassis 101 toward the climbing-surface (CS). These forces keep the chassis 101 in positive contact with the climbing-surface (CS).

This in turn forces the fore track-sprocket 109 toward with the climbing-surface (CS). The fore tangential guide-linkage 106 then maintains contact of the compliant beam portion of the suspension and the leading adhering tractive members 104, guiding the compliant beam 105 to deform to match irregularities in the climbing-surface (CS).

To better understand the device in negotiation of a climbing-surface (CS), FIG. 7 shows a side view of the device climbing a surface (CS) prior to the surface irregularity (CI), and can be compared to FIG. 8. FIG. 9 shows a similar view of the device on a climbing-surface (CS) that has a significant contour or irregularity (CI) to be negotiated. The function of the compliant beam member 105 as it adapts to the climbing-surface (CS) contours and irregularities (CI) is demonstrated.

Also illustrated are the adaptive functions of the contour-following bias-devices 108a, 108b and 108c in supporting the compliant beam member 105 while linking the compliant beam member 105 to the chassis 101, and the adaptive function of the tangential guide-linkages 106 and 107 and of the tensioning mechanism 118. Note particularly how the tensioning mechanism 118 adjusts to allow a greater total area of contact for the endless-track 103 to conform to brief climbing-surface (CS) contours and irregularities (CI).

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A tracked vehicle, comprising:
   a vehicle chassis;
   at least one track for propelling said vehicle, said at least one track comprising a plurality of adhering track members adapted to provide traction when said vehicle transits a surface, wherein at least one track member of said plurality of adhering track members includes a permanent magnet, and wherein said at least one track member is adapted to provide traction via a magnetic force; and
   at least one suspension apparatus, including
      a compliant beam in direct contact with and slidably connected to said at least one track and connecting said at least one track to said chassis,
      at least one rigid body member connected to said compliant beam, and
      at least one bias device connected to said compliant beam,
      wherein said compliant beam transiently deforms to cause said adhering track members to preserve contact with said surface.

2. The tracked vehicle of claim 1, wherein said at least one bias device comprises a plurality of bias devices located at a plurality of points along the compliant beam, adapted to exert at least one of a pulling force or a pushing force to cause the compliant beam to transiently deform.

3. The tracked vehicle of claim 1, wherein said at least one bias device comprises a spring.

4. The tracked vehicle of claim 1, wherein the transient deformation of the compliant beam maximizes the contact area between the adhering track members and said surface.

5. The tracked vehicle of claim 1, wherein said at least one bias device is adjustable.

6. The tracked vehicle of claim 1, wherein said at least one rigid body member comprises a plurality of tangential guides linkages, wherein said guide-linkages link the compliant beam to said vehicle chassis.

7. The tracked vehicle of claim 6, wherein said guide-linkages join to the vehicle chassis by pivot-points.

8. The tracked vehicle of claim 7, wherein the guide-linkages rotate in a plane normal to the surface being transited.

9. The tracked vehicle of claim 6, wherein said guide-linkages join to the compliant beam by pivot-points, upon which the guide-linkages at least one of rotate or slide.

10. The tracked vehicle of claim 1, further comprising a drive mechanism, wherein said drive mechanism includes a drive motor disposed on said vehicle chassis and connected to said at least one track.

11. The tracked vehicle of claim 1, wherein said at least one track comprises a pair of tracks, and wherein each track of said pair of tracks is located on opposite sides of the vehicle chassis from each other.

12. The tracked vehicle of claim 1, further comprising a payload-carrying mechanism, wherein said payload-carrying mechanism includes a rack disposed on said vehicle chassis.

13. A suspension and movement apparatus for a tracked vehicle with a chassis, comprising:

at least one track for propelling said vehicle, said at least one track comprising a plurality of adhering track members adapted to provide traction when said vehicle transits a surface, wherein at least one track member of said plurality of adhering track members includes a permanent magnet, and wherein said at least one track member is adapted to provide traction via a magnetic force; and at least one suspension apparatus, including
- a compliant beam in direct contact with and slidably connected to said at least one track,
- at least one rigid body member connected to said compliant beam,
- at least one bias device connected to said compliant beam,
- wherein said compliant beam transiently deforms to cause said adhering track members to preserve contact with said surface.

14. The apparatus of claim 13, wherein said at least one bias device comprises a plurality of bias devices located a plurality of points along the compliant beam, adapted to exert at least one of a pulling force or a pushing force to cause the compliant beam to transiently deform.

15. The apparatus of claim 13, wherein said at least one bias device is adjustable.

16. The apparatus of claim 13, wherein said at least one rigid body member comprises a plurality of tangential guide-linkages, wherein said guide-linkages link the compliant beam to the vehicle chassis.

17. The apparatus of claim 16, wherein said guide-linkages join to the compliant beam by pivot-points, upon which the guide-linkages at least one of rotate or slide.

18. A tracked vehicle, comprising:
- a vehicle chassis;
- a first track for propelling said vehicle;
- a second track for propelling said vehicle, wherein
  - each of said first track and said second track comprise a plurality of adhering track members adapted to provide traction when said vehicle transits a surface, wherein each track member of said plurality of adhering track members includes a permanent magnet, and wherein said track member is adapted to provide traction via a magnetic force, and
  - said first track is located on an opposite side of said vehicle chassis from said second track, and wherein said first track and said second track are oriented parallel to each other;
- a first suspension apparatus corresponding to said first track; and
- a second suspension apparatus corresponding to said second track, wherein each of said first suspension apparatus and said second suspension apparatus includes
  - a compliant beam in direct contact with and slidably connected to said corresponding track and connecting said corresponding track to said chassis,
  - at least one rigid body member connected to said compliant beam, and
  - at least one bias device connected to said compliant beam,
  - wherein said compliant beam transiently deforms to cause said adhering track members of said corresponding track to preserve contact with said surface.

19. The tracked vehicle of claim 18, wherein said at least one bias device of each of said first suspension apparatus and said second suspension apparatus comprises a plurality of bias devices located at a plurality of points along the respective compliant beam, adapted to exert at least one of a pulling force or a pushing force to cause the respective compliant beam to transiently deform.

20. The tracked vehicle of claim 18, wherein said at least one rigid body member of each of said first suspension apparatus and said second suspension apparatus comprises a plurality of tangential guides linkages, wherein said guide-linkages link the respective compliant beam to said vehicle chassis.

\* \* \* \* \*